United States Patent
Brinkley et al.

[15] 3,654,026
[45] Apr. 4, 1972

[54] ADJUSTABLE DIAMETER BAND BUILDING DRUM

[72] Inventors: Max D. Brinkley, North Canton; Robert I. Griffiths, Akron, both of Ohio

[73] Assignee: The Goodyear Tire & Rubber Company, Akron, Ohio

[22] Filed: Feb. 20, 1970

[21] Appl. No.: 13,253

[52] U.S. Cl. .............................. 156/418, 156/419, 156/420
[51] Int. Cl. ....................................................... B29h 17/16
[58] Field of Search .............. 156/111, 126, 127, 128 R, 129, 156/394, 396, 414–420

[56] References Cited

UNITED STATES PATENTS

| | | | |
|---|---|---|---|
| 1,731,817 | 10/1929 | Hudson | 156/420 |
| 2,416,523 | 2/1947 | Haren et al. | 156/418 |
| 857,726 | 6/1907 | Durio et al. | 156/420 |

FOREIGN PATENTS OR APPLICATIONS 280,640  11/1927  Great Britain ........................ 156/416

*Primary Examiner*—Benjamin A. Borchelt
*Assistant Examiner*—Stephen C. Bentley
*Attorney*—F. W. Brunner and Harlan E. Hummer

[57] ABSTRACT

A machine for building bands composed of successive layers of rubberized tire building material. The machine has a number of arcuately spaced supports which are held in spaced relation from a centrally disposed elongated shaft by a plurality of expansible and retractable spokes. A relatively thin metallic shell with a pair of overlapped ends, is disposed in surrounding relation around the supports and provides a working surface on which the generally cylindrical bands are formed. A rubber sleeve is placed around the shell to maintain it in supported relation against the supports. The diameter and circumference of the shell are varied by expanding and retracting the spokes in unison.

19 Claims, 8 Drawing Figures

Patented April 4, 1972

INVENTORS
MAX D. BRINKLEY
ROBERT I. GRIFFITHS

BY Harlan E. Humm

ATTORNEY

ADJUSTABLE DIAMETER BAND BUILDING DRUM

BACKGROUND OF THE INVENTION

A band building machine is especially useful in the production of large pneumatic tires for trucks and off-the-road equipment. Such tires are usually composed of many layers of ply material, some tires having as many as 30 or 40 layers or plies of rubberized material with metallic or fiber reinforcing cords. A common practice, when building such large tires, is to form a number of bands which are then successively transferred to a tire building drum on which the finished unvulcanized tire carcass is formed, each band being composed of a number of layers of tire building material. Most bands are built in multiples of two layers or plies with a maximum of eight layers for larger tires. The weight of the bands makes it economically unfeasible at this time to build and transfer larger bands on to the drum of a tire building machine. Each succeeding band is naturally larger in size than the preceding band. Therefore, it is important that the outer periphery of the band builder be expansible to permit building different sized bands on any one machine.

Many band building machines employ a set of staggered rollers with adjustable positions for varying the distance around the outer peripheral surface defined by the rollers. The finished bands are removed from this type of band building machine and placed on a device for expanding the bands such that they can be transferred on to the drum of a tire building machine. This invention is directed to providing a band building machine on which the bands can be built and expanded for direct transferral on to a tire building drum. The machine accomplishes the jobs of both the aforementioned band builder and band expander, and substantially reduces the time and cost of transferring the heavy bands between the various machines for building unvulcanized green tire carcasses.

Briefly stated, the invention is a band building machine comprising a hollow shell for supporting at least one layer of rubberized tire building material in a generally cylindrical configuration, the shell having a pair of opposing ends which are in overlapped slidable relation. Means are also provided for mounting one of the pair of opposing ends of the shell in fixed arcuate relation to the other opposing end which is arcuately movable. Means are also provided for supporting the shell in spaced convolute relation about a center axis, and for varying the circumference of the shell to build different size bands.

DESCRIPTION OF THE DRAWING

The following description of the drawing will be better understood by having reference to the annexed drawing, wherein:

FIG. 3 is an enlarged section viewed from the line 3—3 of FIG. 2;

FIG. 4 is an enlarged partial view from the line 4—4 of FIG. 3;

FIG. 7 is a section viewed from the line 7—7 of FIG. 1; and

FIG. 8 is a view from the line 8—8 of FIG. 7.

DESCRIPTION OF THE INVENTION

Figure 1:
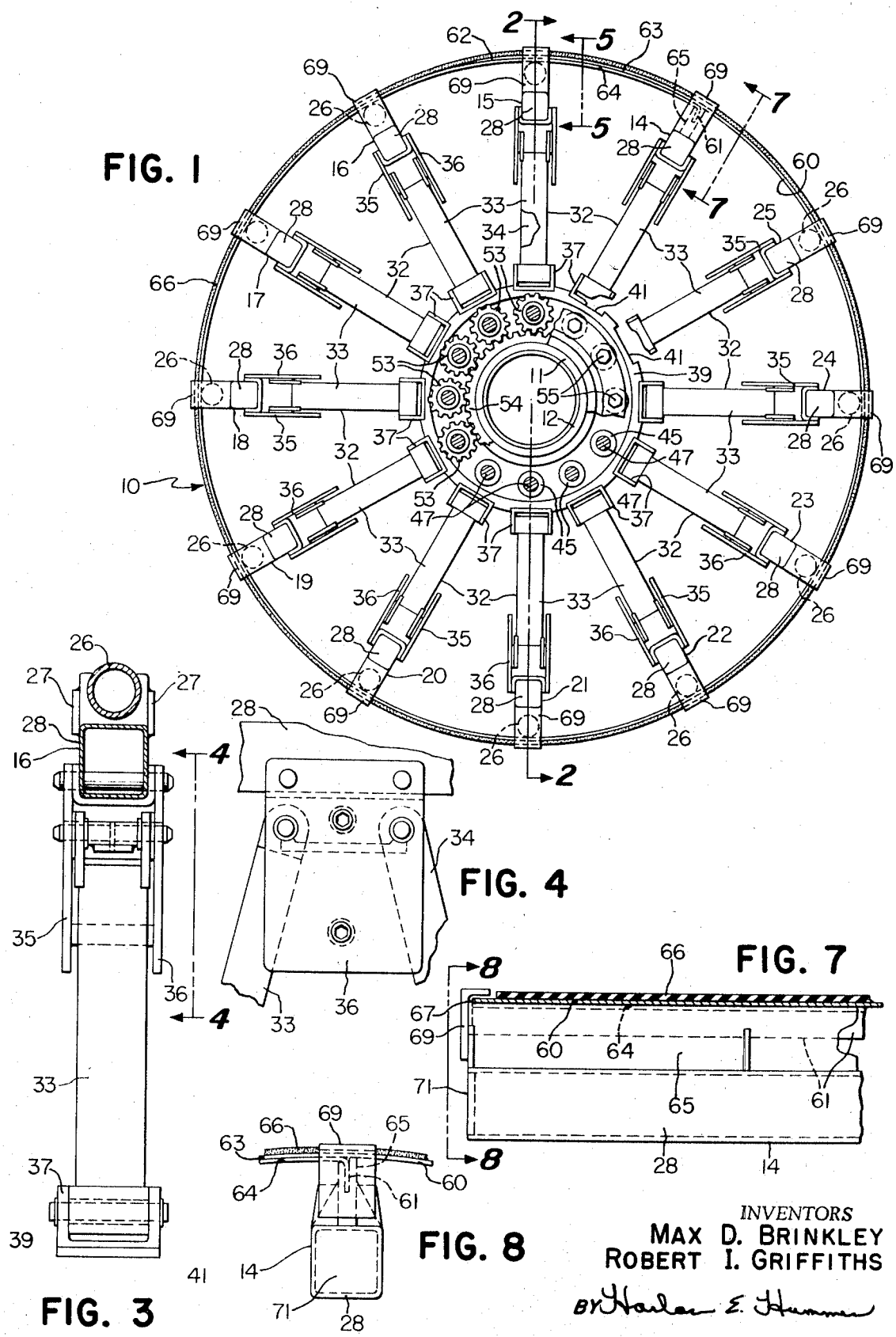
FIG. 1 is an end view of a band building machine made in accordance with the invention.
Figure 2:
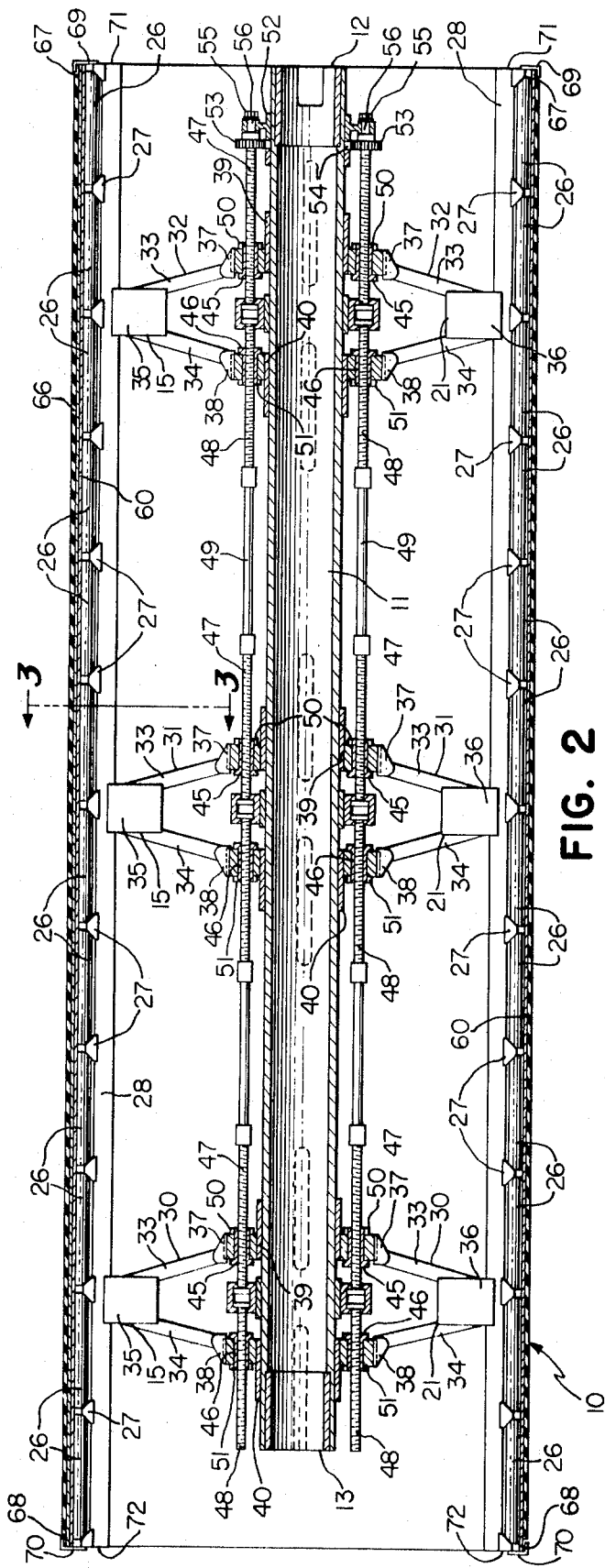
FIG. 2 is a section of the machine viewed from the line 2—2 of FIG. 1.
Figure 5:
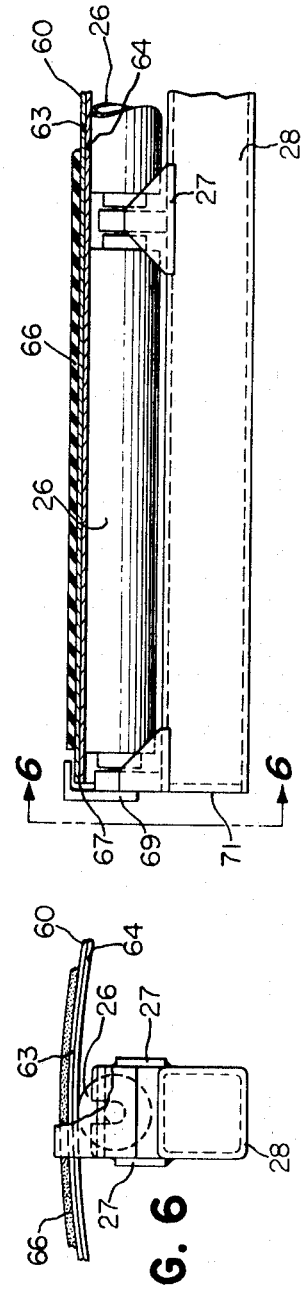
FIG. 5 is a section viewed from the line 5—5 of FIG. 1.
Figure 6:
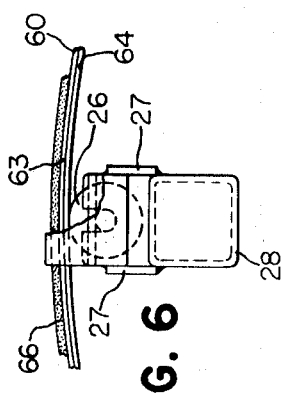
FIG. 6 is a view from the line 6—6 of FIG. 5.

Referring more particularly to FIGS. 1 and 2, there is shown a machine, generally indicated at 10, for building bands generally composed of a number of layers of rubberized tire building material with reinforcing cords. The band building machine 10 comprises an elongated main shaft or hub 11 having opposing ends 12 and 13, which are mountable in a conventionally designed band building drum drive (not shown) for supporting and rotating the band building machine 10.

A plurality of supports 14–25 are equispaced, arcuately around the main shaft 11. The supports 14–25 are equidistant from the longitudinal axis of the shaft 11. Each of the supports 15–25 comprises a series of rollers 26 disposed in aligned end-to-end relation. Each of the rollers 26 is mounted for rotation between a pair of brackets 27 extending in spaced relation from an elongated support beam 28.

A set of spokes 30–32 are disposed between the main shaft 11 and each of the support beams 28 for holding the supports 14–25 in spaced relation around the main shaft 11. Each of the spokes 30–32 comprises a pair of support arms 33 and 34, which are movable relative to each other to vary the spacing between the main shaft 11 and supports 14–25. The support arms 33 and 34 are pivotally mounted at their outer ends between a pair of gusset plates 35 and 36 secured in parallel, projecting relation from the adjacent support beam 28.

The support arms 33 and 34 are pivotally mounted at their opposing other ends to a pair of movers 37 and 38, which are fixed in seated relation against a pair of O-rings 39 and 40, respectively, disposed in spaced, surrounding relation around the main shaft 11.

The O-rings 39 and 40 are keyed in fixed arcuate relation on the main shaft 11 and for sliding axial movement along the main shaft 11. The O-rings 39 and 40 (FIG. 1) are provided with a plurality of arcuately spaced similar seats 41 for receiving the adjacent ends of the movers 37 and 38 and maintaining the support arms 33 and 34 in fixed arcuate spaced relation around the O-rings 39 and 40.

The movers 37 and 38 carry a couple of axially aligned adjusting nuts 45 and 46, which threadably engage a pair of drive screws 47 and 48, which are part of a composite drive rod 49 associated with each set of spokes 30–32. The lateral positions of the O-rings 39 and 40 on the main shaft 11 relative to a plane bisecting the space or angle between the support arms 33 and 34 are adjusted by rotating the adjusting nuts 45 and 46 associate with each of the movers 37 and 38. A pair of nuts 50 and 51 are used to tighten the adjusting nuts 45 and 46 against the movers 37 and 38 to keep them from rotating relative to the movers 37 and 38 once the O-rings 39 and 40 are properly positioned on the main shaft 11.

Each of the drive rods 49 is journalled for rotation in a bracket 52 secured adjacent the end 12 of the main shaft 11. A pinion 53 is mounted for unitary movement on each drive rod 49 adjacent the bracket 52. The pinions 53 are in planar relation. A ring gear 54 is mounted for rotating around the main shaft 11 in meshing engagement with the pinions 53, and acts to rotate the pinions 53 in unison when any one of the drive rods 49 is rotated by any suitable means, e.g., an air wrench with a socket for mating engagement with a coupler 55 positioned on the end 56 of each drive rod 49 extending beyond the bracket 52. Thus, the spacing between the main shaft 11 and supports 14–25 is varied.

The gusset plates 35 and 36 are each provided with a plurality of spaced, aligned pivot mountings for the support arms 33 and 34. The different pivot mountings are used to change the overall length of the spokes 30–32 to accommodate different size bands. For example, the band building machine 10, as shown in FIG. 2, accommodates bands suitable for transferring to tire building drums having a diameter of from about 64 inches to about 66 inches. Bands suitable for transferring to building drums having a diameter of from about 90 inches to about 92 inches are accommodated on the band building machine 10 when, for example, the support arms 33 and 34 are pivotally mounted on the last set of pivot mountings in farthest spaced relation from the support beam 28.

An elongated rim or shell 60 is disposed in surrounding relation around the supports 14–25. The shell 60 has a pair of longitudinally extending opposing ends 61 and 62, which are disposed in overlapping relation. The shell 60 is preferably formed from metal having a gauge, which is sufficiently thin, such that the overlapping portion 63 of the shell 60 will matingly conform to the arcuate configuration of the overlapped portion 64 of the shell 60. A number 14 gauge (0.0747 inch) has been found suitable for this purpose.

The support 14 carries a clamping mechanism 65 instead of the series of rollers 26. The overlapped shell end 61 is crimped and secured in the clamping mechanism 65 of the support 14. Thus, the shell end 61 is arcuately fixed relative to the other shell end 62, which is movable or arcuately slides over the overlapped shell portion 64.

A sleeve or strap 66 is disposed in surrounding relation around the shell 60 intermediate opposing sides 67 and 68 of the shell 60. The sleeve 66 is expansible and formed from any suitable elastomeric material, such as rubber. A rubber sleeve 66 having a gauge of about one-eighth inch has been found suitable for this purpose. The rubber sleeve 66 holds or maintains the shell 60 in supported relation against the supports 14–25, especially when the spokes 30–32 are expanded and contracted to increase and decrease, respectively, the circumference of the shell 60. The rubber sleeve 66 and shell 60 provide a relatively solid working surface on which the generally cylindrical bands are built for transferral to the building drum of a tire building machine.

A pair of guide angles 69 and 70 are provided adjacent the ends 71 and 72 of each of the support beams 28 for preventing the shell 60 from slipping laterally off the supports 14–25.

In operation, the drive screws 49 are operated in unison to expand the spokes 30–32 by moving the support arms 33 and 34 angularly in a direction towards each other until the outer circumference or diameter of the shell 60 corresponds to the inner circumference or diameter of the desired band to be built. The leading edge of a sheet of ply material or inner liner, whatever the case might be, is placed in adhering relation against the rubber sleeve 66. The band building drum drive is then operated to rotate the main shaft 11 which, in turn, causes rotation of the shell 60 and sleeve 66 to wrap the ply material in contacting relation around the sleeve 66. Successive plies are built up on each preceding ply until the band is completed. A device for transferring the band on to the building drum of a tire building machine, is operated to engage the band and pull it from the band building machine 10 on to the building drum after the supports 14–25 are collapsed such that the outer circumference of the shell 60 is substantially smaller than the inside diameter of the band to facilitate removing the band from the band building machine 10. If an additional succeeding band is required, the spokes 30–32 associated with the supports 14–25 are expanded until the new desired outside diameter or circumference of the shell 60 is reached.

Thus there has been provided a band building machine which replaces the aforementioned band builder and band expander used in the production of tires, especially larger tires used for trucks and off-the-road equipment.

While certain representative embodiments and details have been shown for the purpose of illustrating the invention, it will be apparent to those skilled in the art that various changes and modifications may be made therein without departing from the spirit or scope of the invention.

What is claimed is:

1. A band building machine, comprising in combination:
   a. an elongated hollow shell having a single pair of opposing ends in overlapped relation and an uninterrupted solid working surface intermediate said ends;
   b. means for supporting the shell in spaced, generally cylindrical relation about the longitudinal axis of the shell, said means including a plurality of arcuately spaced spokes in abutting, unfastened relation to the shell and extending radially from the shell in a direction towards the longitudinal axis of the shell;
   c. means for varying the circumference of the shell while maintaining the shell in a generally cylindrical configuration, said means including means for expanding and contracting the spokes radially in unison;
   d. a stretchable sleeve disposed in stretched surrounding relation around the shell and biasing the shell against the spokes; and
   e. means for individually adjusting the length of each spoke separate from the other spokes, to accommodate building different size bands.

2. The machine of claim 1, which includes:
   a. means for mounting one of the pair of overlapping ends for arcuate movement about the longitudinal axis of the shell; and
   b. means for mounting the other of the pair of overlapping ends in a fixed arcuate position relative to the arcuately moving end of the shell.

3. The machine of claim 2, wherein the means (a) includes an elastomeric sleeve disposed in stretched, surrounding relation around the shell intermediate opposing sides of the shell.

4. The machine of claim 3, wherein the elastomeric sleeve is composed of rubberized material.

5. The machine of claim 3, wherein the shell is composed of metal having a gauge sufficiently thin that the overlapping end of the shell matingly conforms to the configuration of the overlapped end of the shell when the elastomeric sleeve is positioned around the shell.

6. The machine of claim 5, wherein the means for varying the circumference of the shell includes means for exerting radially outwardly against the shell, force greater than force exerted radially inwardly by the elastomeric sleeve against the shell.

7. The machine of claim 6, which includes means for reducing the force exerted radially outwardly against the shell below the force exerted radially inwardly by the elastomeric sleeve against the shell.

8. A band building machine comprising in combination:
   a. an elongated hollow shell having a single pair of longitudinally extending ends in overlapped relation and an uninterrupted solid working surface intermediate the ends;
   b. a plurality of arcuately spaced spokes disposed radially between the shell and the longitudinal axis of the shell, for supporting the shell in spaced, generally cylindrical relation about the longitudinal axis of the shell;
   c. means for expanding and contracting the spokes radially in unison to vary the circumference of the shell and correspondingly expand and collapse the shell;
   d. means for individually adjusting the length of each spoke separate from the other spokes to accommodate building different size bands;
   e. means for mounting one of the pair of ends of the shell for arcuate movement about the longitudinal axis of the shell;
   f. means for mounting the other of the pair of ends of the shell in a fixed arcuate position relative to the arcuately moving end of the shell; and
   g. means for maintaining the shell in supported relation adjacent the spokes without disrupting arcuate movement of the arcuately moving end of the shell.

9. The machine of claim 8, wherein the means (g) is an elastomeric sleeve disposed in surrounding relation around the shell.

10. The machine of claim 9, which includes:
    h. means for rotating the shell about its longitudinal axis.

11. The machine of claim 10, wherein each spoke includes a pair of support arms pivotally joined at one end adjacent the shell, the arms having opposing free ends mounted for reciprocating movement towards and away from each other and parallel to the longitudinal axis of the shell.

12. The machine of claim 11, which includes: each
    i. means interposed between the support arms and shell for transferring radial force from the arms against the shell, said means including at least one gusset plate associated with each spoke and having adjustable pivot mountings for each pair of support arms.

13. A band building machine comprising in combination:
    a. an elongated rotatable shaft;
    b. a plurality of drive rods equispaced in axial parallel relation around the shaft, said drive rods mounted for rotation about their longitudinal axes and for unitary rotation with the shaft;
    c. means for rotating the drive rods in unison about their axes;
    d. an elongated support associated with each drive rod and disposed in parallel axial relation to the associated drive rod;

e. a set of spokes disposed in spaced relation between each support and associated drive rod, each spoke including a pair of arms pivotally joined to the support, said arms having opposing ends which are mounted on the associated drive rod for opposite unitary movement therealong in response to rotation of the drive rod;

f. an elongated shell disposed in surrounding relation around the support for supporting the band of tire building material in a generally cylindrical configuration, the shell having a pair of opposing ends in overlapped relation;

g. means for securing the overlapped end of the shell to one of the supports in fixed arcuate relation to the overlapping end which is arcuately movable in response to radial movement of the spokes; and h. an elongated rubber sleeve disposed in surrounding relation around the shell intermediate opposing sides of the shell for maintaining the shell in supported relation against the support.

14. The machine of claim 13, wherein each drive rod includes a pair of drive screws threadably engaging the support arms.

15. The machine of claim 14, which includes means for individually adjusting the length of each spoke.

16. The machine of claim 15, wherein the rod rotating means (c) includes a pinion carried by each drive rod, and a ring gear journalled for rotation about the shaft in meshing and driving relation with the pinions.

17. The machine of claim 16, wherein the spoke adjusting means includes a gusset plate interposed between each support and spoke, and means for pivotally mounting the arms at a plurality of positions spaced along an axis normal to the longitudinal axis of the shaft.

18. The machine of claim 17, which includes means for individually adjusting the position of each arm along the threadably engaged drive screw.

19. The machine of claim 18, which includes means for rotating the shaft to facilitate wrapping tire building material around the shell.

* * * * *